United States Patent
Kreutzer et al.

(10) Patent No.: US 9,746,059 B2
(45) Date of Patent: Aug. 29, 2017

(54) BALL SCREW DRIVE

(71) Applicant: Schaeffler Technologies GmbH & Co. KG, Herzogenaurach (DE)

(72) Inventors: Mario Kreutzer, Sonneberg (DE); Dieter Adler, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 359 days.

(21) Appl. No.: 14/413,115

(22) PCT Filed: Jul. 4, 2013

(86) PCT No.: PCT/EP2013/064180
§ 371 (c)(1),
(2) Date: Jan. 6, 2015

(87) PCT Pub. No.: WO2014/006152
PCT Pub. Date: Jan. 9, 2014

(65) Prior Publication Data
US 2015/0167800 A1  Jun. 18, 2015

(30) Foreign Application Priority Data
Jul. 6, 2012 (DE) .................. 10 2012 211 871

(51) Int. Cl.
*F16H 25/22* (2006.01)

(52) U.S. Cl.
CPC .... *F16H 25/2214* (2013.01); *Y10T 74/19772* (2015.01)

(58) Field of Classification Search
CPC .................................. F16H 25/2214
See application file for complete search history.

(56) References Cited

U.S. PATENT DOCUMENTS 5,988,007 A   11/1999 Nishimura
6,282,971 B1   9/2001 Shirai et al.
(Continued)

FOREIGN PATENT DOCUMENTS

CN   2106939   6/1992
CN   1196782   10/1998
(Continued)

*Primary Examiner* — Terence Boes
(74) *Attorney, Agent, or Firm* — Volpe and Koenig, P.C.

(57) ABSTRACT

A ball screw drive with a spindle nut (1) arranged on a screw spindle (2) and a continuous ball channel (7) formed by the screw spindle (2) and the spindle nut (1), in which channel balls arranged along a continuous ball track (8) circulate continuously, wherein the continuous ball channel (7) includes a load channel (9) wound in a spiral shape, with more than one winding, about a spindle axis (S) and a deflecting channel (10) which continuously connects the two ends of the load channel (9) to one another, wherein the spindle nut (1) has a nut part (4), on the inner circumference of which a ball groove (6) is formed being wound in a spiral shape about the spindle axis S, which ball groove, together with a ball groove (3) of the screw spindle (2) being wound in a spiral shape about the spindle axis S, forms the load channel (9), and wherein a deflecting element (5) including the deflecting channel (10) is arranged on the outer periphery of the nut part (4), and the deflecting ends (12) of the deflecting element (5) axially spaced apart from one another each penetrate a recess (11) through the thickness of the wall of the nut part (4), in order to deflect balls from the load channel (9) into the deflecting channel (10), and wherein the recess (11) has an unloading bore (15) connecting to the ball groove (6) of the nut part (4) and to the deflecting end (12) of the deflecting element (5) for unloading the balls, the axis of which unloading hole is arranged at a parallel distance to a plane (E1) containing the spindle axis (S).

6 Claims, 4 Drawing Sheets

(56) References Cited

U.S. PATENT DOCUMENTS

| | | | |
|---|---|---|---|
| 6,286,383 B1 | 9/2001 | Shirai et al. | |
| 2003/0172759 A1* | 9/2003 | Hayashi | F16H 25/2214 74/424.86 |
| 2012/0103121 A1 | 5/2012 | Kuo et al. | |

FOREIGN PATENT DOCUMENTS

| | | |
|---|---|---|
| DE | 102010050175 | 5/2012 |
| EP | 1281880 | 2/2003 |
| EP | 2515000 | 10/2012 |
| JP | 200018359 | 1/2000 |
| WO | 9949240 | 9/1999 |
| WO | 2012160149 | 11/2012 |

* cited by examiner

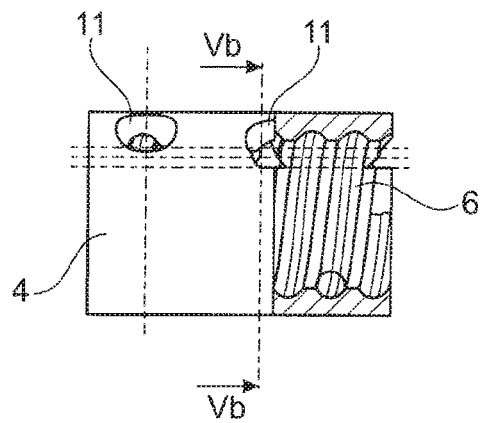
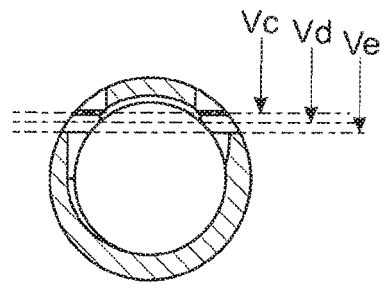
Fig. 5a
Fig. 5b
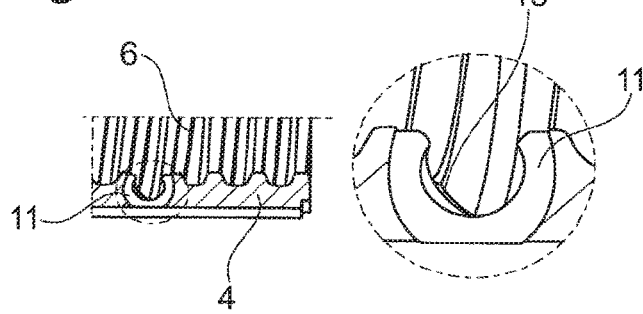
Fig. 5c
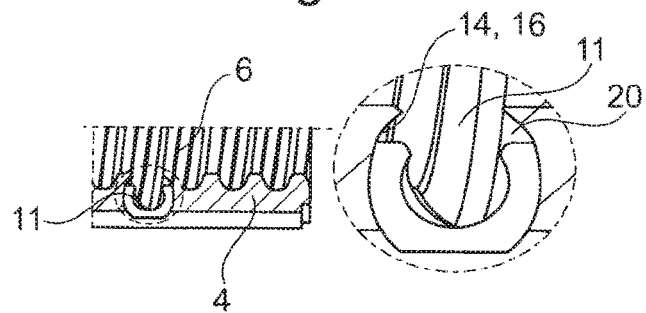
Fig. 5d
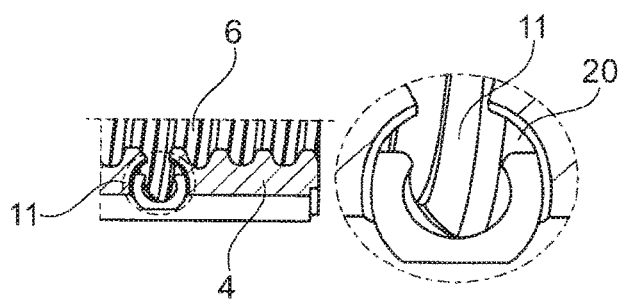
Fig. 5e

BALL SCREW DRIVE

BACKGROUND

The present invention relates to a ball screw drive with a spindle nut arranged on a threaded spindle. Such ball screw drives convert rotational motion between the threaded spindle and the spindle nut into a relative axial displacement.

From EP1281880A2, for example, a ball screw drive has been disclosed. The spindle nut and the threaded spindle are each provided with a ball groove that is wound in a helical shape about the spindle axis and together form a load channel in which balls can roll under loading on the ball grooves.

The spindle nut has a nut part on whose outer periphery there is a deflection element whose deflection ends spaced apart from each other in the axial direction each engage a recess that passes through the wall thickness of the nut part, in order to deflect balls from the load channel into a deflection channel.

SUMMARY

The object of the present invention is to provide a ball screw drive in which the change from the load channel into the deflection channel is further improved.

This objective is met by the ball screw drive with one or more features of the invention. The ball screw drive according to the invention has a spindle nut arranged on a threaded spindle, wherein the threaded spindle and the spindle nut form an endless ball channel in which balls circulate along an endless ball track. This endless ball channel has a load channel that is wound in a helical shape over more than one winding about a spindle axis, wherein the two ends of this load channel are connected to each other continuously by means of a deflection channel. The spindle nut has a nut part on whose inner periphery a ball groove is formed that is wound in a helical shape about the spindle axis and forms, together with a ball groove of the threaded spindle wound in a helical shape about the spindle axis, the load channel. On the outer periphery of the nut part there is a deflection element that has the deflection channel and whose deflection ends spaced apart from each other in the axial direction each engage in a recess that passes through the wall thickness of the nut part to deflect balls from the load channel into the deflection channel. The recess has an unloading hole that connects on one side to the ball groove of the nut part and on the other side to the deflection end of the deflection element for unloading the balls and its hole axis is arranged at a parallel distance to a plane containing the spindle axis.

With the ball screw drive according to the invention it is possible to be able to maintain the wall thickness of the ball groove shoulder of the ball groove on the inner periphery of the nut part in the region of the recesses as much as possible. While the deflection element formed as a deflection tube, for example, in the known ball screw drive specified above, is passed with its thick tube ends through a correspondingly sized recess completely through the wall thickness of the nut part, in the ball screw drive according to the invention it is sufficient to insert the deflection end of the deflection element only up to the beginning of the unloading hole in the recess. This means that the unloading hole can be built significantly smaller in diameter than the diameter of a hole for passing through a deflection tube. Therefore, because less material must be removed from the ball groove shoulder of the ball groove, the load capacity and the reliability of the ball screw drive according to the invention are significantly improved.

The hole axis of the unloading hole is arranged at a parallel distance to a plane containing the spindle axis, thus it does not intersect the spindle axis. With this arrangement it is possible to provide an approximately tangential connection of the unloading hole to the load channel wound in a helical shape, so that the balls in a preferred refinement can be transferred tangentially out of the load channel into the deflection channel.

The unloading hole can connect directly to the ball groove of the nut part with its end facing the threaded spindle, wherein a gradual increase in the ball groove can be provided in the transition from the ball groove of the nut part to the unloading hole. Under unloading conditions, the balls can be transferred out of the load channel into the load-free deflection channel with the ball screw drive according to the invention.

The unloading hole arranged at a parallel distance to a plane containing the spindle axis allows the formation of a wall of the unloading hole that is formed at its end facing the threaded spindle over only a portion of the periphery of the unloading hole on the nut part. The opposing open region is available for holding the deflection end of the deflection element.

For a low-noise and soft displacement of the balls out from the load channel into the deflection channel, one refinement according to the invention provides that a hole axis of the unloading hole is arranged tangential to the, viewed in cross section through the ball screw drive, circular ball track of the balls in the load channel. This means that the balls are lifted tangentially out of their circular track and moved into the deflection channel.

For ball screw drives according to the invention, the ball track for the balls winds about the spindle axis in the load channel with a pitch t in a helical shape. If the helical-shaped ball track is projected onto a plane, a full winding of 360 degrees is mapped onto this plane as two legs that are arranged at an angle to each other and meet at a vertex. The angle between one of these legs and an axis arranged perpendicular to the spindle axis is designated as the lead angle. In one refinement according to the invention, it is provided that, viewed in the longitudinal section through the ball screw drive, a hole axis of the unloading hole connects at this lead angle to the end of the helical-shaped ball track in the load channel. This means that the balls lift tangentially out of their helical track in the load channel and can be displaced into the deflection channel. In this refinement according to the invention, the balls experience a minimum of undesired acceleration or deceleration forces.

The unloading hole can be drilled economically, especially for large-scale series production.

In one refinement according to the invention, it is provided that the recess has, on the nut part, an insertion hole for holding the deflection end of the deflection element, with the unloading hole connecting to this insertion hole, wherein the insert hole is larger in diameter than the unloading hole. If the deflection element is inserted with its deflection end into the insertion hole, it can be pushed with its deflection end until it contacts a radial projection with its end face, with the narrowed unloading hole beginning at this projection. The inner diameter of the tubular deflection end and the diameter of the adjacent unloading hole are matched to each other so that the balls are guided perfectly.

The unloading hole preferably has a diameter that is smaller than 1.1 times the ball diameter. The unloading hole connects to the ball groove of the nut part. Therefore, because it is larger than the ball diameter, to form the unloading hole, material must be removed from a ball groove shoulder bordering the ball groove. Limiting the diameter of the unloading hole to 1.1-times the ball diameter ensures, on one hand, that the balls are deflected without loading into the deflection channel and, on the other hand, as little material as possible is removed from the ball groove shoulder. In this way, a ball screw drive with high loading capacity can be provided.

The unloading hole and the insertion hole can be arranged at an angle to each other, in order to achieve several advantages: if the insertion hole is arranged at a right angle to a plane containing the spindle axis, this position allows a problem-free insertion of the deflection ends of the deflection element into the insertion holes. If the unloading hole is arranged below the lead angle of the helical-shaped ball groove of the nut part, this position allows—as was already mentioned above—for balls to be lifted out from the load channel with a minimum of acceleration and can be displaced into the deflection channel. This unloading hole produced in this way reaches up to the ball groove of the spindle nut, wherein only a small equal amount of material of the ball groove shoulders must be removed from both axial sides of the ball groove through the drilling of the unloading hole.

BRIEF DESCRIPTION OF THE DRAWINGS

The invention will be explained in more detail below using an embodiment illustrated in a total of six figures. Shown are.

DETAILED DESCRIPTION OF THE PREFERRED EMBODIMENTS

Figure 1:
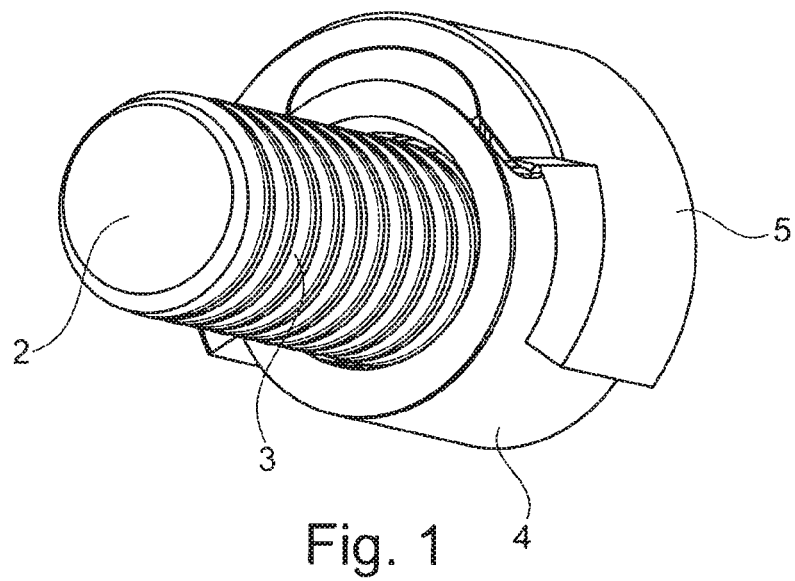
FIG. 1 a ball screw drive according to the invention.

FIG. 1 shows a ball screw drive according to the invention. A spindle nut 1 is arranged so that it can rotate on a threaded spindle 2. The threaded spindle is provided on its outer circumference with a thread-shaped ball groove 3 wound about the spindle axis. The spindle nut 1 has a nut part 4 and a deflection element 5 that is arranged on the outer circumference of the nut part 4.

Figure 2:
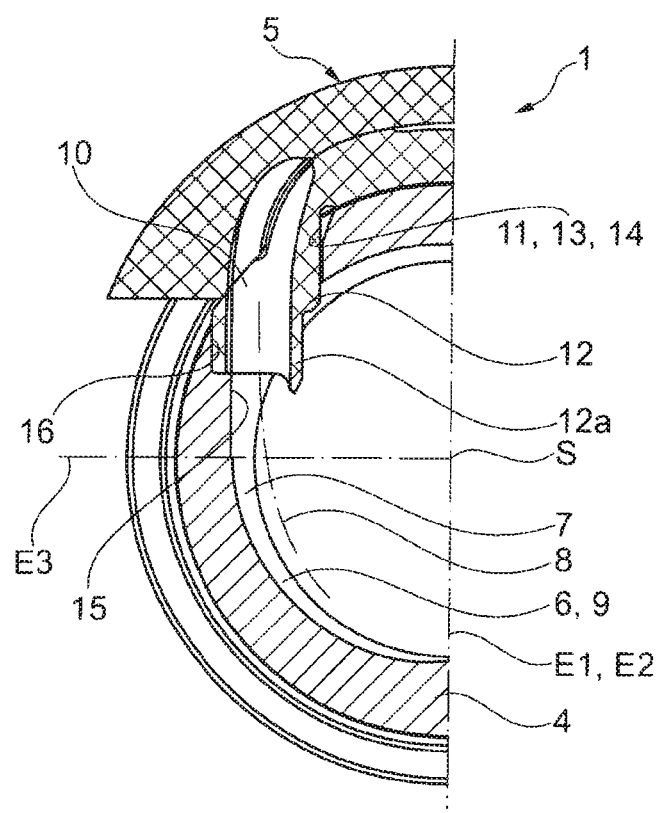
FIG. 2 a half section of the ball screw drive according to the invention.

FIG. 2 shows a cross section through the spindle nut 1, wherein, however, only one half is shown. On the inner periphery of the nut part 4, a ball groove 6 that is wound about the spindle axis in a helical shape is formed for the rolling of not-shown balls.

The spindle nut 1 and the threaded spindle 2 together form an endless ball channel 7 in which the balls are moved along a ball track 8, wherein this ball track 8 is shown in FIG. 2 with dash-dot lines. The ball channel 7 is formed by a load channel 9 and also by a deflection channel 10. The two ends of the load channel 9 are connected to each other continuously by means of the deflection channel 10.

The lateral surface of the nut part 4 is provided with two axial and peripheral recesses 11 that are spaced apart from each other and pass through the wall thickness of the nut part 4. The deflection element 5 has, on each of its two ends, an approximately tubular stepped deflection end 12, wherein these two deflection ends 12 are each inserted into one of the recesses 11.

The balls that are not shown are lifted out from the load channel 9 and deflected into the deflection channel 10 of the deflection element 5 with the help of the deflection end 12. It is possible in another refinement according to the invention that the two recesses are spaced apart in the axial direction and arranged flush with each other in the axial direction.

FIG. 2 shows that the recess 11 has an insertion hole 14 and an unloading hole 15. The insertion hole 14 has a narrowed hole section 16 and a hole section 17 with an expanded diameter. The two hole sections 16, 17 are arranged coaxial to each other, wherein a hole axis of this insertion hole 14 is arranged perpendicular to the spindle axis of the ball screw drive and also at a parallel distance to a plane E1 containing the spindle axis.

The unloading hole 15 is arranged with its hole axis at a parallel distance to a plane E2 containing the spindle axis, wherein the planes E1, E2 coincide in the embodiment. The hole axis of the unloading hole 15 is arranged at an angle to the plane of the paper in the embodiment and connects to the ball groove 6 on the end of the load channel 9 at the pitch angle of the ball groove 6 wound in a helical shape about the spindle axis.

In FIG. 2, a plane E3 is indicated that runs perpendicular to the plane of the paper and perpendicular to the plane E1. The insertion hole 14 is arranged with its hole axis perpendicular to this plane E3. The unloading hole 15 is arranged at an angle to the plane E3 out from the plane of the paper, wherein this angle corresponds to the pitch angle of the ball groove wound in a helical shape.

If the not-shown balls are displaced along the ball groove 6 into the connected unloading hole 15, they are free from loading, that is, no longer in rolling contact with the two ball grooves 3, 6 of the threaded spindle 2 and the spindle nut 1.

The diameter of the unloading hole 15 is greater than the ball diameter and less than 1.1 times the ball diameter. In this way, on one hand, a complete unloading of the balls is guaranteed and, on the other hand, it is ensured that a ball groove shoulder of the nut part 4 bordering the ball groove 6 is only slightly weakened, which will be explained in detail farther below.

The hole axes of the stepped insertion hole 14 and the unloading hole 15 are arranged at an angle to each other as described above. The described position of the insertion hole 14 allows a problem-free placement of the deflection element 15 on the outer periphery of the nut part 4, wherein, with a radial inward movement of the deflection element 5, the tubular deflection ends 12 can engage in the associated insertion holes 14 without a problem.

Figure 3:
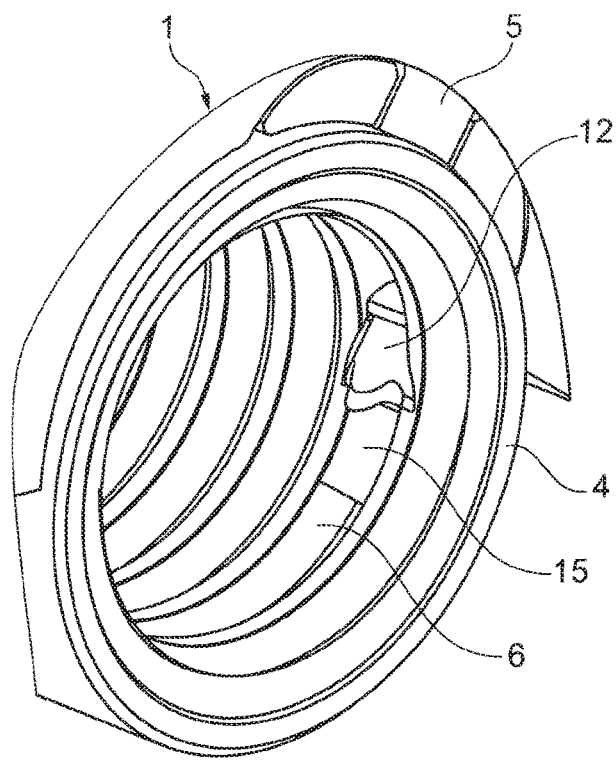
FIG. 3 a cutout of the ball screw drive according to the invention in perspective view, but without the threaded spindle, FIG. 4 a nut part of the ball screw drive according to the invention shown in section and in a perspective view, FIGS. 5a to 5e the nut part of the ball screw drive according to the invention with details in different sectional planes, and FIGS. 6a to 6c the ball track of the balls in the load channel in a schematic view.

FIG. 3 shows a cut-out of the spindle nut 1 in a perspective view. The nut part 4 with the placed deflection element 5 can be clearly seen, likewise the tubular deflection end 12 of the deflection element 5 passing through the wall thickness of the nut part 4. The position of the unloading hole 15 that connects to the ball groove 6 of the nut part 4 can also be clearly seen.

Figure 4:
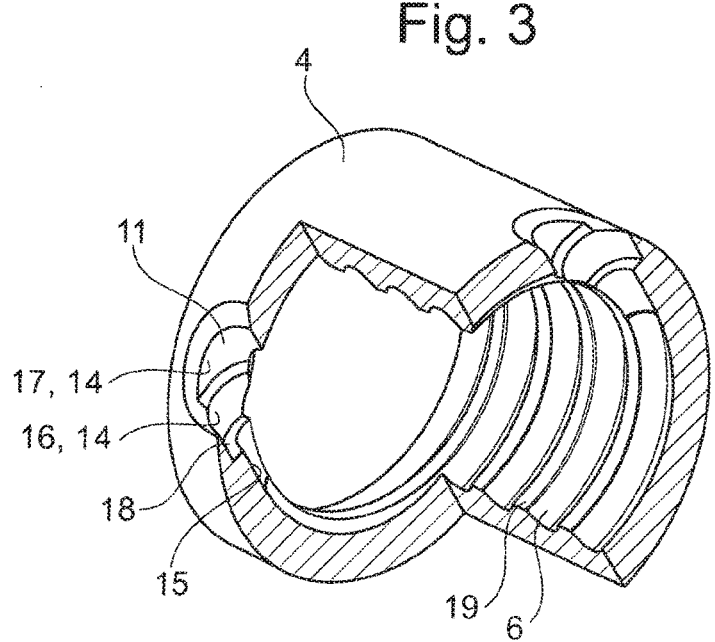

FIG. 4 shows the split nut part 4 in a perspective view. The two recesses 11 that are spaced apart from each other in the axial direction and are offset on the peripheral side relative to each other can be clearly seen, wherein the insertion hole 14 with the narrowed hole section 16 and the expanded hole section 17 can be clearly seen and the unloading hole 15 connecting to the insertion hole 14 in the axial direction can also be seen. The deflection end 12 of the deflection element 5 is pushed into the insertion hole 14 until the tubular deflection end 12 contacts a radial projection 18 that is formed in the transition from the narrowed hole section 16 of the insertion hole 14 to the unloading hole 15.

FIG. 4 clearly shows a ball groove shoulder 19 that borders the ball groove 6. FIG. 4 clearly shows that, due to the unloading hole 15 that is only slightly larger in diameter than the ball diameter, the ball groove shoulder 19 is only slightly reduced in thickness. For this ball screw drive according to the invention, the ball track 8 for the balls winds about the spindle axis in a helical shape with a pitch t. If the helical-shaped ball track is projected onto a plane (see FIG. 6a), one full winding of 360 degrees is mapped onto this plane as two legs that are arranged at an angle to each other and meet at a vertex. The angle α between one of these legs and an axis arranged perpendicular to the spindle axis is designated as lead angle α. The hole axis of the unloading hole 15 is connected to the end of the helical-shaped ball track in the load channel below this lead angle α and drilled into the nut part 4.

From FIG. 4 it can be seen that the unloading hole 15 is connected to the ball groove 6 of the nut part 4, wherein only a small amount of equal material was removed by the drilling at the two ball groove shoulders 19 bordering the ball groove 6. On its side facing away from the unloading hole 15, the ball groove shoulder 19 borders the ball groove 6 on the adjacent winding. This adjacent winding is already in the load channel, so that the ball groove shoulder 19 transfers axial loads between the threaded spindle 1 and the spindle nut 2.

The unloading hole 15 has a cylindrical construction in the embodiment. It is arranged so that the balls are transferred out from the load channel bordered by the ball groove 6 tangentially into the deflection channel 10.

FIGS. 5a to 5e show the nut part 4 according to the invention in a longitudinal half-section (FIG. 5a), wherein FIG. 5b shows a cross section along the line Vb/Vb. In FIG. 5b, three section planes Vc, Vd, Ve are drawn that are shown in FIGS. 5c, 5d, 5e in partial section and in enlarged detail. In the different radial section planes, the formation of the recess 11 and the position of the unloading hole 15 can be clearly seen. Especially in FIGS. 5c, 5d, 5e, it can be clearly seen that a wall of the insertion hole 14 and the unloading hole 15 is not formed over the full periphery. Especially in FIGS. 5d and 5e it can be seen that between the wall of the narrowed hole section 16 of the insertion hole 14 and the unloading hole 15, a peripheral gap 20 is formed, in which engages an end section 12a of the deflection end 12 of the deflection element 5 projecting according to the figure. This end section 12a engages in the ball groove 3 of the threaded spindle 2, as can be seen in FIG. 2a.

Figure 6A:
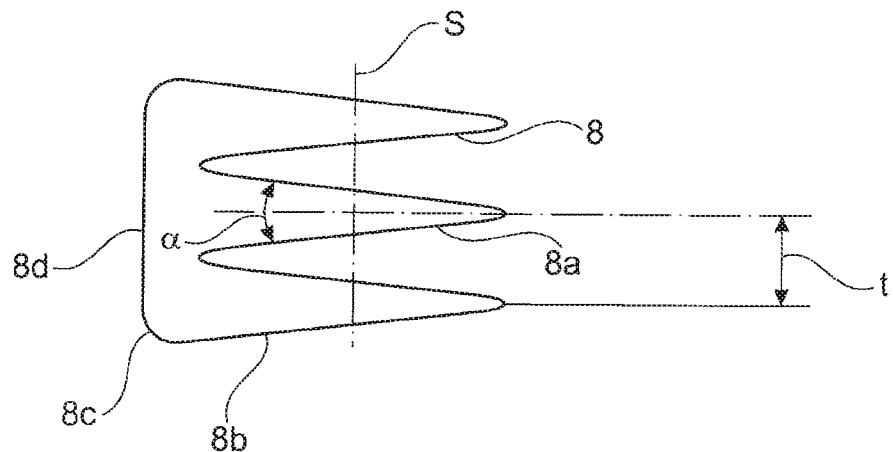
Figures 6B, 6C:
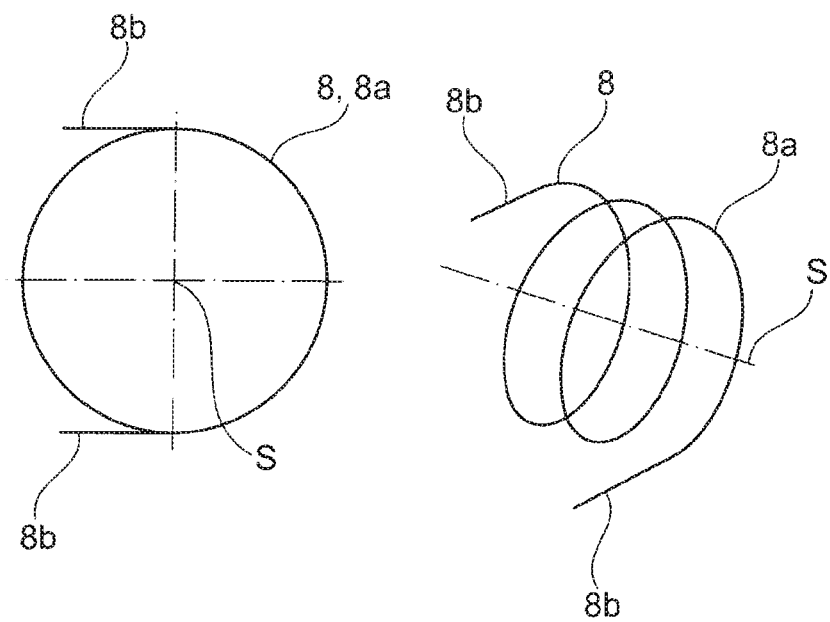

In FIGS. 6a, 6b, 6c, the path of the balls along the endless ball track 8 is shown schematically. In particular, FIG. 6a shows a load section 8a of the ball channel 8 that is wound about the spindle axis S in a helical shape at the lead angle α. At the ends of the load section 8a of the ball track 8, a tangential section 8b connects at this lead angle α, wherein the tangential section 8b is specified by the unloading hole 15 and by the tubular deflection end 12 of the deflection element 5. The hole axis of the unloading hole 15 coincides with the tangential section 8b of the ball track 8. This tangential section 8b transitions into a curvature section 8c of the ball track 8 that is defined by the deflection channel 10 of the deflection element 5. At the curvature section 8c, a straight return section 8d of the ball track 8 connects, wherein the balls are guided along the return section 8d back to the beginning of the load section 8a.

FIG. 6b clearly shows the circular shape of the load section 8a of the ball track 8 wound in a helical shape about the spindle axis S, as well as the tangential sections 8b of the ball track 8 connecting to the ends of the load section 8a.

FIG. 6c shows schematically the ball track 8 in a perspective view, wherein only the load section 8a and the two tangential sections 8b are shown. Especially in FIGS. 6b and 6c it can be seen in connection with the other figures that the unloading hole 15 is arranged tangential to the circular ball track of the balls in the load channel seen in cross section through the ball screw drive.

In FIG. 6a, the pitch t is specified at which the load section of the ball track is wound about the spindle axis S. For a given ball track diameter, this pitch corresponds to a certain pitch angle, wherein the tangential section 8b of the ball track connects at this pitch angle tangentially to the end of the load section 8a of the ball track 8.

Furthermore, in FIGS. 6a, 6b, 6c in connection with FIGS. 2 and 4 it can be seen that the unloading hole 15 is arranged in the pitch direction of the helical shaped ball groove 6 of the nut part 4.

LIST OF REFERENCE NUMBERS

1 Spindle nut
2 Threaded spindle
3 Ball groove
4 Nut part
5 Deflection element
6 Ball groove
7 Ball channel
8 Ball track
8a Load section
8b Tangential section
8c Curvature section
8d Return section
9 Load channel
10 Deflection channel
11 Recess
12 Deflection end
13
14 Introduction hole
15 Unloading hole
16 Narrowed hole section
17 Expanded hole section
18 Radial projection
19 Ball groove shoulder
20 Circumferential gap

The invention claimed is:

1. A ball screw drive comprising a spindle nut arranged on a threaded spindle and an endless ball channel formed by the threaded spindle and the spindle nut, with balls arranged along an endless ball track circulating continuously in said ball channel, the endless ball channel comprises a load channel that is wound about a spindle axis S in a helical shape over more than one winding and a deflection channel that continuously connects two ends of the load channel to each another, the spindle nut has a nut part, on an inner circumference of which, a ball groove is formed being wound in a helical shape about the spindle axis S, with said ball groove, together with a ball groove of the threaded spindle wound in a helical shape about the spindle axis S, forming the load channel, and a deflection element comprising the deflection channel is arranged on an outer periphery of the nut part, deflection ends of the deflection element spaced apart from one another in an axial direction each engage a recess that passes through a wall thickness of the nut part, in order to deflect the balls from the load channel into the deflection channel, the recess has an unloading hole connecting, on one side, to the ball groove of the nut part and, on the other side, to the deflection end of the deflection element for unloading the balls, and a hole axis of said unloading hole is arranged at a parallel distance to a plane (E1) containing the spindle axis (S), the hole axis of the unloading hole is arranged tangential to, viewed in cross section through the ball screw drive, the endless ball track of the balls in the load channel which is circular, and the ball track in the load channel is wound with a pitch angle in a helical shape about the spindle axis, wherein, viewed in longitudinal section through the ball screw drive, the hole axis of the unloading hole connects at said pitch angle to the end of the helical-shaped ball track in the load channel.

2. The ball screw drive according to claim 1, wherein a wall of the unloading hole at an end thereof facing the threaded spindle is formed by only one part of a circumference of the unloading hole on the nut part.

3. The ball screw drive according to claim 1, the recess has an insertion hole for holding the deflection end of the deflection element at which the unloading hole connects, and the insertion hole is greater in diameter than the unloading hole.

4. The ball screw drive according to claim 1, wherein the unloading hole is formed with a diameter that is greater than a ball diameter and less than 1.1-times the ball diameter.

5. The ball screw drive according to claim 3, wherein the hole axis of the unloading hole and a hole axis of the insertion hole are arranged at an angle to each other.

6. The ball screw drive according to claim 5, wherein the insertion hole is arranged perpendicular to the spindle axis (S) and the unloading hole is arranged at an angle to the spindle axis (S) at a pitch angle of the helical-shaped ball groove of the nut part.

\* \* \* \* \*